(12) United States Patent
Fishman

(10) Patent No.: US 6,491,280 B1
(45) Date of Patent: Dec. 10, 2002

(54) PERSONAL COMPUTER TOWER GUARD

(76) Inventor: Gary Lee Fishman, 15 Chestnut Way, Manalapan, NJ (US) 07726

(*) Notice: Subject to any disclaimer, the term of this patent is extended or adjusted under 35 U.S.C. 154(b) by 0 days.

(21) Appl. No.: 09/653,629

(22) Filed: Sep. 1, 2000

(51) Int. Cl.[7] .......................... A47G 29/00; F16M 11/00
(52) U.S. Cl. .................... 248/683; 248/205.3; 248/909; 150/165; 312/208.3
(58) Field of Search .............................. 248/683, 205.3, 248/909, 672; 312/249.11, 208.3; 150/154, 156, 165; 206/586; 361/687; 604/304, 307; 602/58; D14/444, 440

(56) References Cited

U.S. PATENT DOCUMENTS

| | | | | | |
|---|---|---|---|---|---|
| 4,922,980 A | * | 5/1990 | Parker | ........................ | 150/165 |
| 4,932,524 A | * | 6/1990 | Hodson | ........................ | 206/320 |
| D323,929 S | * | 2/1992 | Hodson | ........................ | D3/30.1 |
| 5,354,261 A | * | 10/1994 | Clark | ........................ | 602/58 |
| 5,590,781 A | * | 1/1997 | Shackelford | ................ | 206/521 |
| D377,788 S | * | 2/1997 | Carlson | ...................... | D14/114 |
| D400,551 S | * | 11/1998 | Watkins | ...................... | D14/114 |

\* cited by examiner

*Primary Examiner*—Leslie A. Braun
*Assistant Examiner*—Gwendolyn Baxter

(57) ABSTRACT

A flexible guard panel which may be releasably fastened to or about the front panel of a PC computer tower to protect the buttons on drive openings.

10 Claims, 4 Drawing Sheets

PERSONAL COMPUTER TOWER GUARD

FIELD OF THE INVENTION

The invention of the present application relates to devices to safeguard the front of a PC, especially the doors, drive slots and buttons.

BACKGROUND OF THE INVENTION

There have been many attempts to protect the front openings, doors, slots and buttons of home computers. One attempt involves the fastening of a door hinged to a frame which is fastened about the diskette drive slot, or disc drawer. The door opens so as to allow access to the slot or drawer. The door may have a safety latch, or lock, to safeguard the underlying slot or drawer. Other emergency measures undertaken by e.g. parents to protect the computer drives range from temporary duck tape blocks to blocking off the room that contains the computer. These methods lead to mess and inconvenience. In addition, computers are coming out with more and more drives. The CD drive drawer has been added to the diskette drive slot in most new computers. In addition, the newest computers often include a zip drive slot. As the number of drive slots and drawers increase, the configuration of the front panel changes to accommodate easy access to the drives.

In addition to adding drives to the computer front panel, the dimensions of the front panel may also change due to the reconfiguration of the PC tower to accommodate its bulk. Product changes to differentiate a new product line, or attract new customers, also occur. These constant changes can make door guard designs obsolete. Also, when a new computer is purchased, the guards securely fastened to the front panel of the old computer are difficult, if not impossible, to remove and secure to the new one.

It is an object of the present invention to provide a PC tower guard, which may be used with towers of various dimensions.

Another object of the present invention is to provide a PC tower guard, which may be reused, if desired, on a newer tower.

SUMMARY OF THE INVENTION

A universal guard to cover and protect the drive panel of a PC tower. The guard is made from a sheet of pliable material. It has a cutout profile made up of a) a generally rectangular central panel, with a bottom edge, a top edge, and two side edges, b) at least one side tab connected to the front panel along at least one side edge, c) a top tab connected to the front panel along the top edge, and having a narrower profile than the central panel, and d) shoulder portions above the side tab and wide of the front tab for fitting the guard to the drive panel. At least two adhesive fasteners are needed to fasten the guard to the tower. Preferably the side tabs have a narrower profile than the top tab, permitting the guard to be used "sideways". Thus the guard is able to be used on towers of varying dimensions.

DETAILED DESCRIPTION OF THE INVENTION

Figure 1:
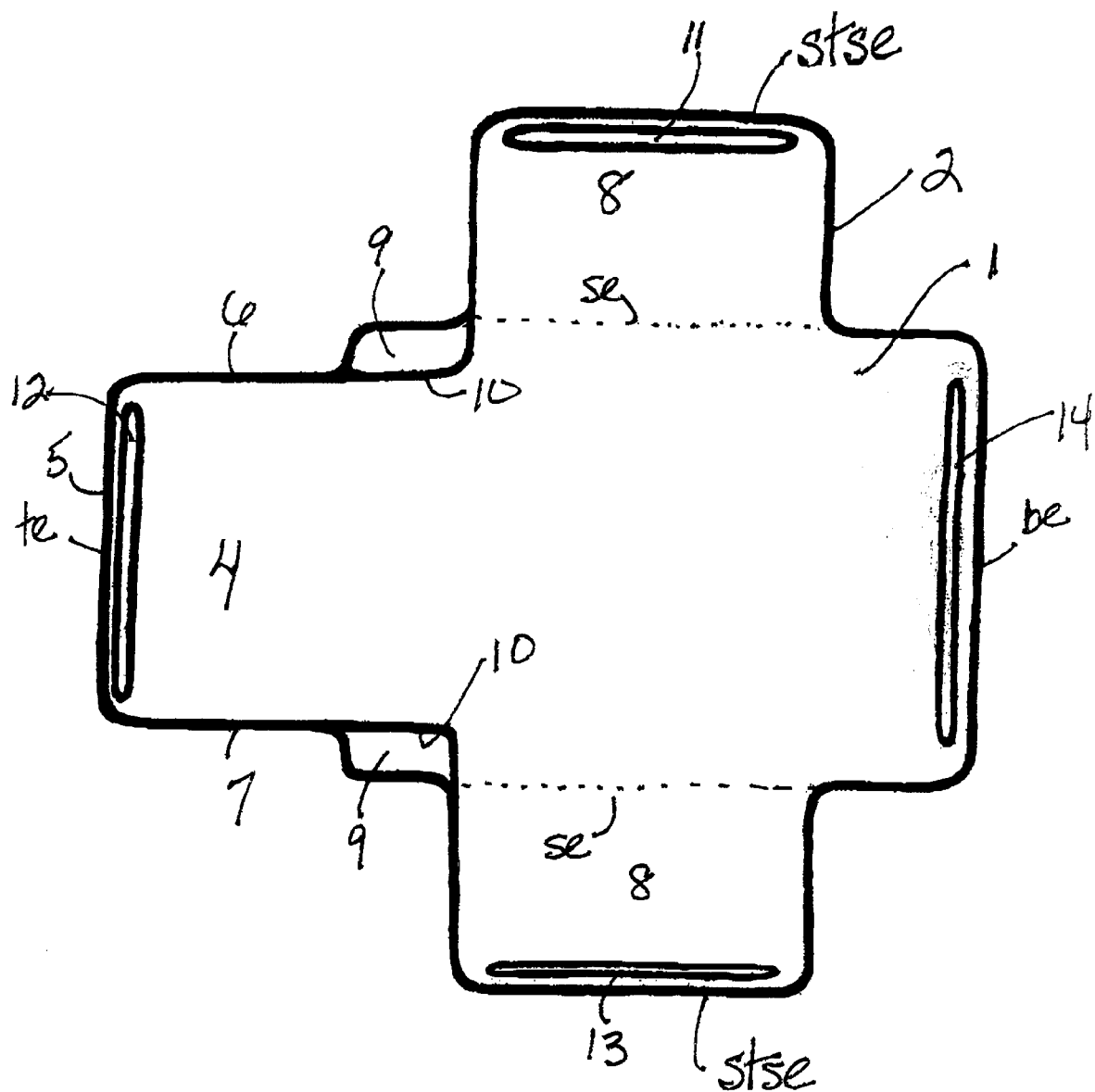
FIG. 1 is a top plan view of the cutout profile flexible sheet of the preferred embodiment of the universal PC tower guard of the present invention.
Figure 2:
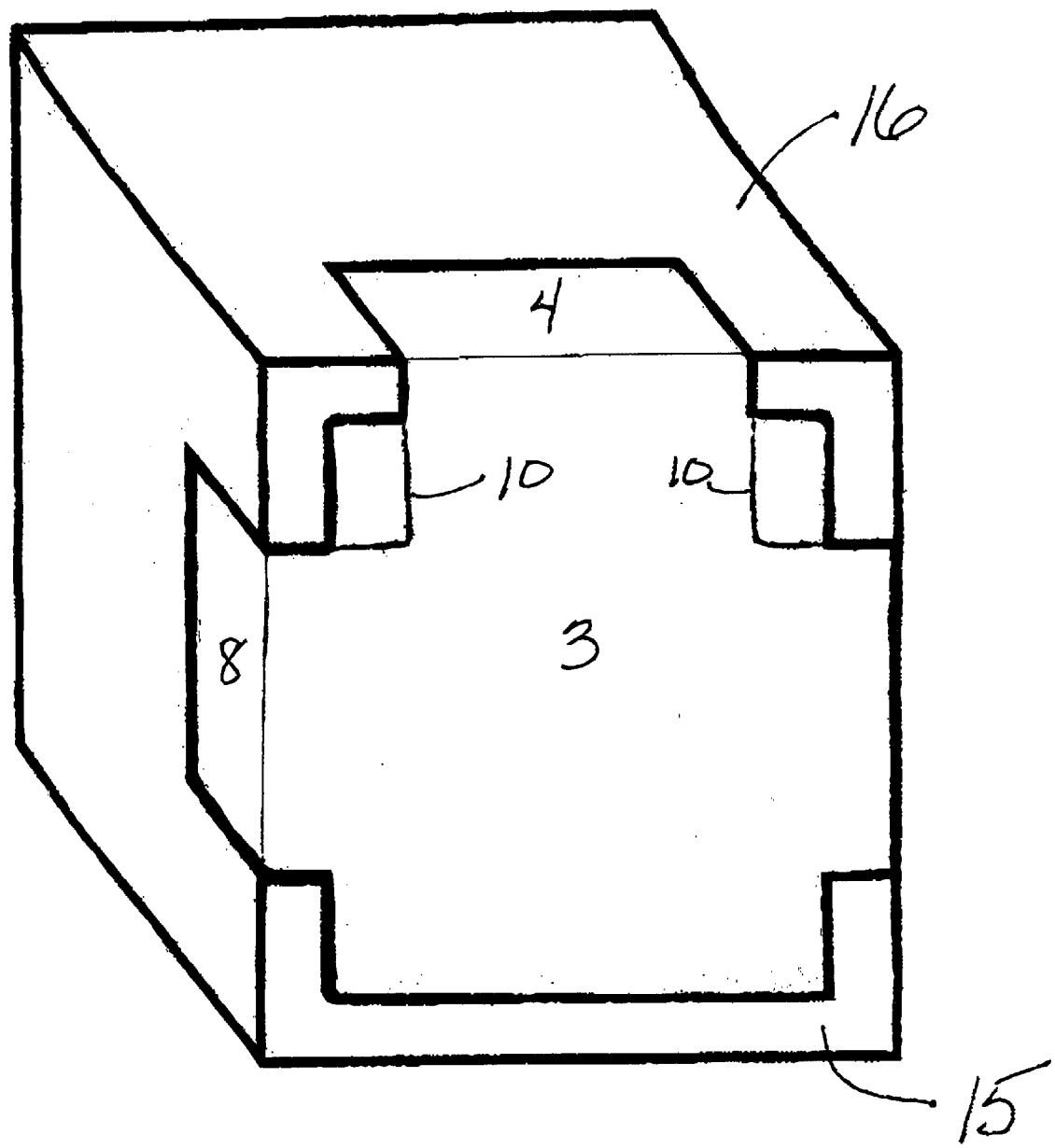
FIG. 2 is a front perspective view of the guard of FIG. 1, fastened to the front panel of a short PC tower.
Figure 3:
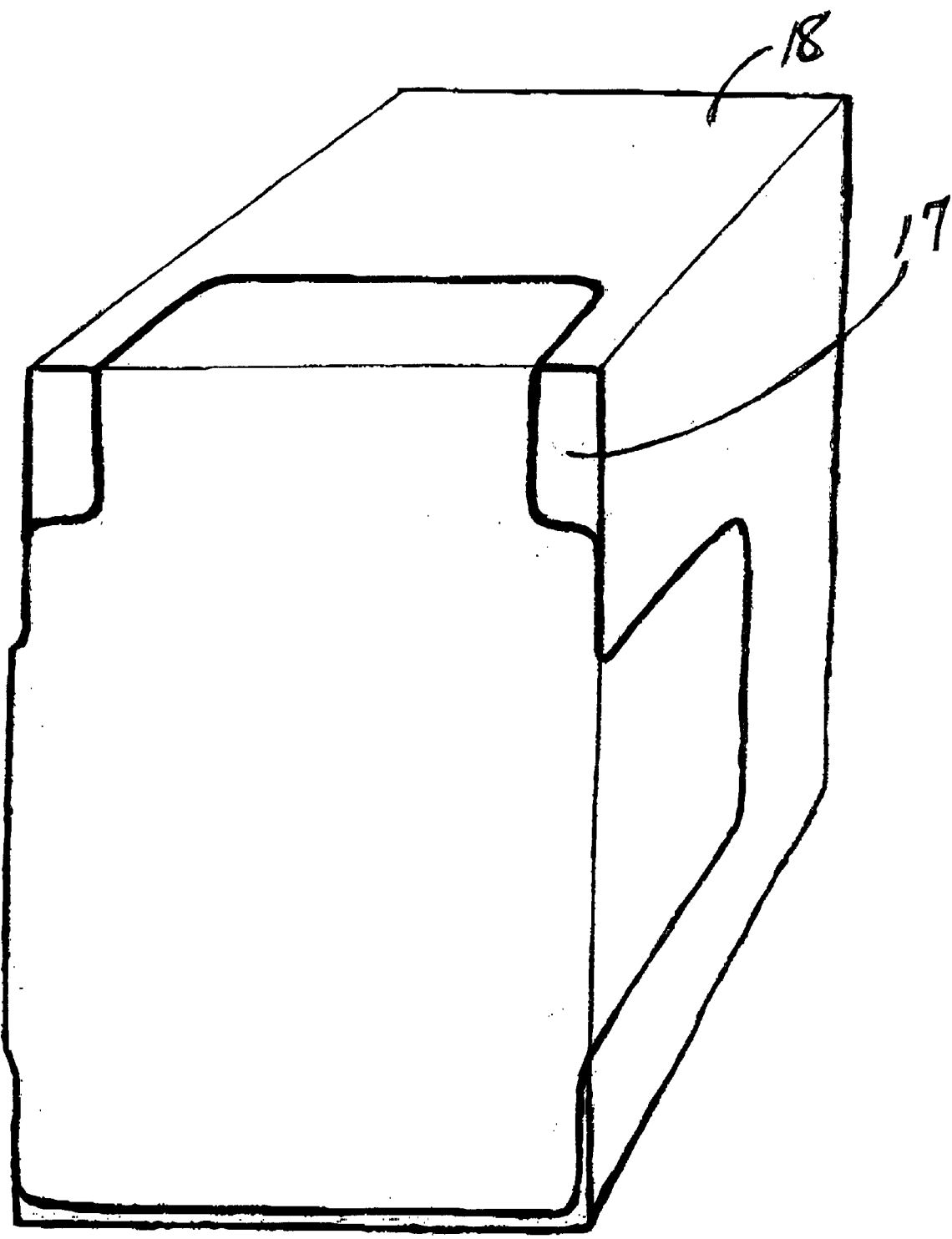
FIG. 3 is a front perspective view of the guard of FIG. 1, fastened to the front panel of a PC tower taller than the tower depicted in FIG. 2.
Figure 4:
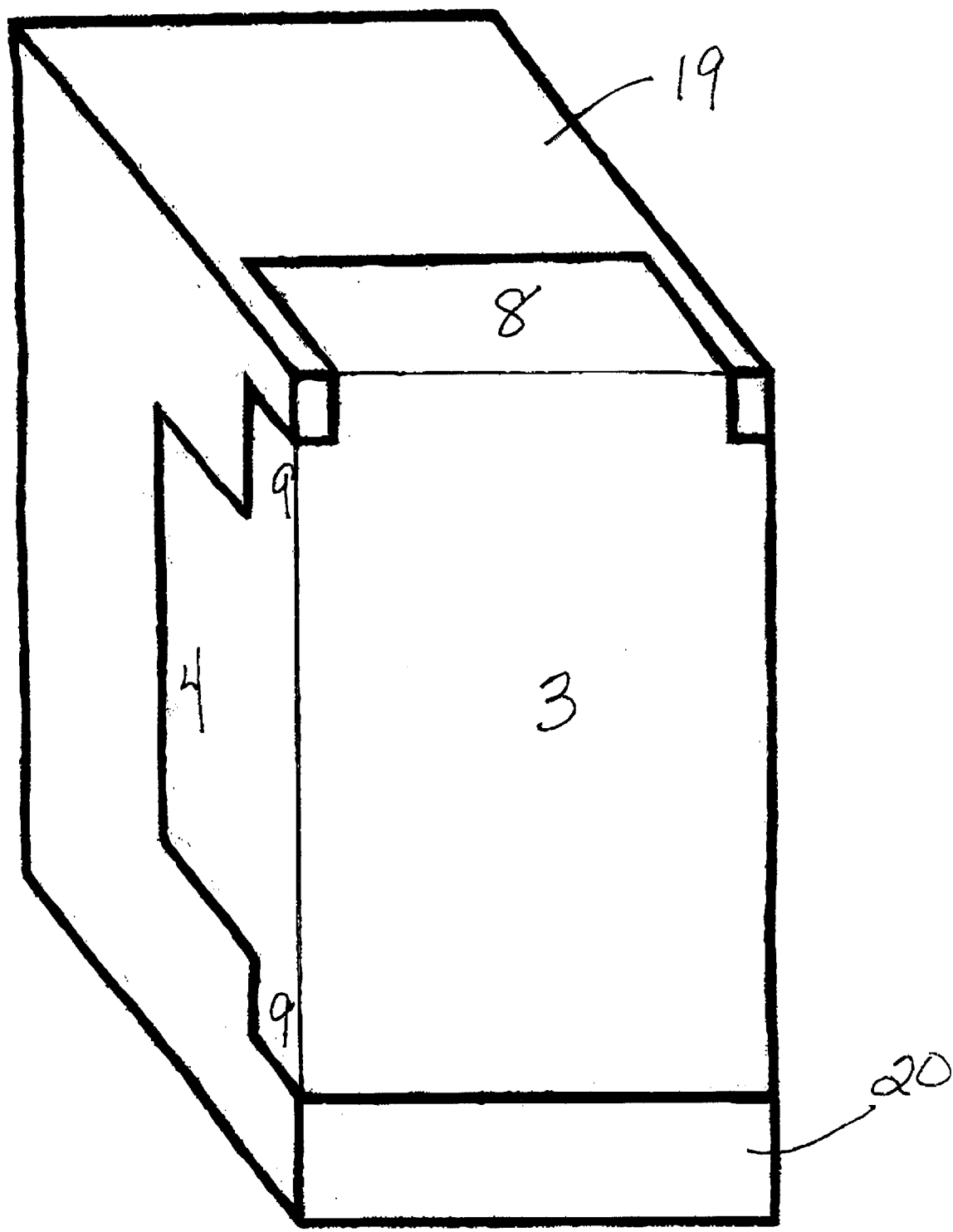
FIG. 4 is a front perspective view of the guard of FIG. 1, fastened to the front panel of a PC tower taller than the tower depicted in FIG. 3.

FIG. 1 illustrates the preferred embodiment of the universal PC tower guard of the present invention. Use of the guard on various PC towers is illustrated in FIGS. 2, 3 and 4. The typical CPU, or tower, of the desk top personal computer (PC) is a rectangular cube, with one face or panel thereof, typically the front panel, bearing the various buttons, drive slots and drive drawers to the computer. The connections of the PC tower to a power source, peripherals, and phone line are to the opposite face, or back panel. Easy access to the front panel of the tower presents a difficulty when curious children investigate the various buttons and drives. The result may be lost information, altered files, and actual damage to the hardware. The present invention seeks to provide an easy way to protect the tower, yet permit easy access to the computer user. In addition, the present invention provides a guard that may be easily fitted to towers of various dimensions.

The guard is made of a sheet, 1, a flexible material, such as rubber, plastic, or fabric, so as to facilitate folding the fastening tabs of the guard sheet about the PC tower, as described below. Various more complex structures can be imagined, but the simplest is a flexible sheet. Preferably, the sheet material is also stiff enough to protect the buttons on the computer once the guard is in place. The sheet has a cutout profile, 2, to adapt its use to PC towers of various dimensions. As shown in FIG. 1, the sheet has a central panel, 3, of generally rectangular shape, with bottom edge, be, side edges, se, and a top edge, te. The sheet also has a top tab, 4, connected to the top edge, and at least one side tab, 8, connected to a side edge. These tabs are provided so as to secure the guard atop the drive panel (the front panel in FIGS. 2, 3 & 4) without having to secure the guard directly to the drive panel. Thus the guard accommodates the shifting configurations of the drive panel in new tower designs.

The top tab has a narrower profile (between its side edges 6 & 7) than the central panel. The top tab has a region of attachment, 12, along its top edge, 5. The preferred embodiment of the guard of the present invention shown in FIG. 1, has two side tabs, 8 attached to the central panel along its side edges, se. Also as shown, the side tabs have regions of fastening, 11 & 12, located near its side tab side edges, stse. Shoulders, 9, of the central panel, 3, are provided to cover the top corners of the front panel, 15, of the PC tower, 16, shown in FIG. 2. At least two, and preferably three, adhesive fastenings are made from at least two, and preferably three, of the regions of fastening, to the top and sides of the tower. For shorter towers, the guard may be further cut-away, or provided with a line of weakening, or tear line, 10 to remove all, or a portion of the shoulder, 9.

As shown in FIG. 3, the cutout profile of the preferred guard of FIG. 1, is adapted to be used on a PC tower taller than the one shown in FIG. 2. When used on a tower of these dimensions, the top tab may extend across a greater portion of the front panel, 17, of the tower, 18, with the adhesive fastening portion of the top tab folded across the top of the PC tower. When fitting the preferred guard to towers of the intermediate height shown in FIG. 3, if necessary, the central panel may be placed a little higher than shown in FIG. 3, to achieve a fastening to the top of the tower, but not leave too much of the bottom front panel uncovered.

As shown in FIG. 4, the preferred guard of the present invention may also be used on a very long, narrow tower, 19, by rotating the central panel, 3, with at least one side tab, 8, becoming a rotational a top tab, and the original top tab, 4, and shoulders, 9, becoming a rotational side tab. Again, the central panel may be placed higher on the front panel, 20, of the tower, if desired, as long as the too much of the bottom of the front panel, 20, is not left uncovered. With the rotational "height" provided by the two side tabs of the preferred guard this is not a tough trade-off, and the guard can accommodate very narrow towers.

The guard of the present invention is fastened to the tower by at least two, preferably three, and more preferably four, adhesive fastenings. These fastenings will be described with relation to FIG. 2, which is a top plan view of the preferred embodiment of the guard. There are four regions of fastening, 11, 12, 13, & 14. Fastenings made from at least two of these regions will secure most of the central panel of the guard across the front panel of the tower. Fastenings from at least three of these regions will secure more of the central panel across the front panel of the tower. It is preferred that fastenings be made from the underside of the guard, to present a smother appearance of the guard on the tower. Portions of pressure sensitive adhesive faced tape may be secured to the guard at the fastening regions by any known method, such as sewing, or permanent adhesive. Preferably the pressure sensitive adhesive face is covered by an adhesive release sheet, which may be removed in whole or in part to fasten the exposed adhesive to the tower. To facilitate fastening the guard to many towers, it is advantageous that this adhesive fastening be releasable from the tower. However, to simply make many fastenings of the guard, it is of little consequence whether the adhesive releases from the tower or from the tape, so long as the exposed surface of the adhesive is able to create new fastening of the guard to the tower. A very simple way to accomplish the provision of fastening means is to provide double-sided adhesive tape with the cut out blank, for the user to secure to the region of fastening to the tower. If desired, sufficient tape may be provided to make many fastenings. Velcro® fasteners, of the commercially available two-piece fastening system, may be used in conjunction with the adhesive fasteners. In Velcro®, one piece has a surface of loops, and the other piece has a surface of hooks, so that the surfaces, when pressed together, form a firm, but releaseable, fastening. Many other methods of fastening are known, and all are within the purview of the present invention. While the invention has been described in relation to a preferred embodiment, those variations known in the art are hereby included, it being understood that the invention is limited only by the following claims.

I claim:

1. A universal guard for the panel of a PC tower having an aperture for access to the computer drives, said guard panel comprising a sheet of pliable material having two surfaces, an inner surface and an outer surface, and having a cutout profile comprising
   a) a generally rectangular central panel, having a bottom edge, a top edge, and two side edges,
   b) at least one side tab connected to the generally rectangular central panel along at least one side edge,
   c) a top tab connected to the generally rectangular central panel along the top edge, and having a narrower profile than the central panel,
   d) the portion of the generally rectangular central panel above the side tab and wide of the top tab forming a shoulder tab for fitting the guard to the drive panel, and
   e) at least two adhesive fasteners, a first adhesive fastener on said top tab and a second adhesive fastener on the side tab, whereby the tabs are adapted to bend substantially perpendicular to said central panel for fastening said guard to the PC tower for, securing the guard over the aperture for access to the computer drives.

2. A universal guard as in claim 1, wherein the top tab is generally rectangular.

3. A universal guard as in claim 2, wherein the adhesive fasteners comprise at least one pressure sensitive adhesive tapes.

4. A universal guard as in claim 3, wherein the adhesive fasteners comprise double-sided adhesive tapes.

5. A universal guard as in claim 3, wherein one side of the adhesive tape is mechanically fastened to the sheet by a line of stitching.

6. The universal guard of claim 3, wherein the sheet material in the shoulder tab is easily trimmed.

7. A universal guard as in claim 4, wherein at least one of the double-sided adhesive tapes comprises a two-piece, double-sided adhesive tape with a central hook and loop-type fastener.

8. The universal guard of claim 1, comprising two side tabs having a profile narrower than the profile of the top tab.

9. The universal guard of claim 1, having at least three adhesive fastenings.

10. A universal guard for the panel of a PC tower having an aperture for access to the computer drives, said guard panel comprising a sheet of pliable material having two surfaces, and having a cutout profile comprising
    a) a generally rectangular central panel, having a bottom edge, a top edge, and two side edges, and having no adhesive fasteners on either surface thereof,
    b) at least one side tab connected to the generally rectangular central panel along at least one side edge,
    c) a top tab connected to the generally rectangular central panel along the top edge, and having a narrower profile than the central panel,
    d) the portion of the generally rectangular central panel above the side tab and wide of the top tab forming a shoulder tab for fitting the guard to the drive panel, wherein the material in the shoulder tab is easily trimmed along the lines of weakening provided therein, and
    e) at least two adhesive fasteners, for fastening at least two of the tabs of the guard to the tower.

* * * * *